US008166486B2

(12) United States Patent
Song et al.

(10) Patent No.: US 8,166,486 B2
(45) Date of Patent: Apr. 24, 2012

(54) ADJUSTING WORKLOAD TO ACCOMMODATE SPECULATIVE THREAD START-UP COST

(75) Inventors: Yonghong Song, Palo Alto, CA (US); Spiros Kalogeropulos, Los Gatos, CA (US); Partha Pal Tirumalai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1175 days.

(21) Appl. No.: 11/950,121

(22) Filed: Dec. 4, 2007

(65) Prior Publication Data
US 2009/0144746 A1 Jun. 4, 2009

(51) Int. Cl.
*G06F 9/46* (2006.01)
(52) U.S. Cl. ......... 718/105; 718/100; 718/102; 718/104
(58) Field of Classification Search ............ None
See application file for complete search history.

(56) References Cited

U.S. PATENT DOCUMENTS

| 5,745,778 A * | 4/1998 | Alfieri ............... 712/1 |
| 7,926,058 B2 * | 4/2011 | Amin ............... 718/102 |
| 2007/0022412 A1 * | 1/2007 | Tirumalai et al. ....... 717/140 |

* cited by examiner

*Primary Examiner* — Kenneth Tang
(74) *Attorney, Agent, or Firm* — Brooks Kushman P.C.

(57) ABSTRACT

Methods and apparatus provide for a workload adjuster to estimate the startup cost of one or more non-main threads of loop execution and to estimate the amount of workload to be migrated between different threads. Upon deciding to parallelize the execution of a loop, the workload adjuster creates a scheduling policy with a workload for a main thread and workloads for respective non-main threads. The scheduling policy distributes iterations of a parallelized loop to the workload of the main thread and iterations of the parallelized loop to the workloads of the non-main threads. The workload adjuster evaluates a start-up cost of the workload of a non-main thread and, based on the start-up cost, migrates a portion of the workload for that non-main thread to the main thread's workload.

17 Claims, 7 Drawing Sheets

ADJUSTING WORKLOAD TO ACCOMMODATE SPECULATIVE THREAD START-UP COST

BACKGROUND

In conventional systems, the speed and efficiency of many computing applications depend in large part upon the availability of processing resources. To this end, conventional computer systems provide computing architectures that commonly incorporate multithreaded processes that enable the sharing of resources in order to accommodate multiple paths of execution within a computer/operating system. As such, a thread may be characterized as a separately executable portion of a process. Each thread typically has its own distinct program counter and represents a separate movement of a processor through program instruction space and storage. In this manner, a program may be broken-up into multiple different threads. Ideally, this segmentation avoids requiring a computer process to execute a single unitary process or program from start to finish with pronounced intervals of wasted processing time. As such, a thread continuously accesses a resource until either its execution is interrupted or that thread must wait for a resource it requires to become available.

To facilitate coordination of threads and associated resources, threads typically share a priority scheme or schedule that partially dictates allocation of processing cycles as between different threads. A task dispatcher program may use this scheme to assign and dispatch a central processing unit(s) (CPU), timeslice, or other resource to each thread. Such exemplary resources might include hardware registers, database files and other memory resources. Thus, multithreaded operation can provide the illusion of simultaneous execution of multiple programs, given the relatively high processing speeds relative to that of other resources in the computer.

As a consequence, when synchronizing multiple threads of control in conventional systems, often one thread owns a resource that another thread needs. When one thread finds that another thread owns such a resource, the thread can either "spin" to wait for the resource to be released, or "yield", thereby giving up the processor and waiting to be notified when the resource is available.

Spinning is a technique in which a process repeatedly checks to see if a condition is true, such as waiting for keyboard input or waiting for a lock (i.e. a lock on a required resource) to become available. Spinning can also be used to delay execution for some amount of time; this was necessary on old computers that had no method of waiting a specific length of time other than by repeating a useless loop a specific number of times. Spinning can be a valid strategy in certain special circumstances, most notably in the implementation of spinlocks within conventional operating systems designed to run on SMP systems.

SUMMARY

With regard to conventional systems, automatic parallelization has been studied and used commercially for a long time. Recent transactional memory hardware enables the possibility of speculative automatic parallelization. Speculative automatic parallelization will parallelize the execution of a loop, even if the loop cannot be proven to be free of cross-loop dependencies at compile time. However, because of the hardware limitations of transactional memory (e.g. the number of stores cannot exceed a certain amount), in order to avoid transaction failure the workload for speculative loop threads has to be small. In other words, the granularity of the parallel region cannot be too big.

At runtime of parallelization, when a parallelized loop is encountered, a set of threads will be created or reused from previous creation. The original main thread will share the work with all other non-main threads. The non-main threads, however, often incur startup cost because various hardware structures (e.g. private cache and/or translation lookaside buffer (TLB)) are not warmed up with necessary data which impacts execution time as the required data has to be imported from memory. Such startup cost is significant for speculative automatic parallelization because speculative automatic parallelization has small work granularity. The relatively large startup cost also negatively affects overall performance.

Techniques discussed herein significantly overcome the deficiencies of conventional applications such as those discussed above as well as additional techniques also known in the prior art. As will be discussed further, certain specific embodiments herein are directed to a workload adjuster. Given a loop to be executed, the workload adjuster will analyze whether the loop can be a candidate for either traditional parallelization or speculative parallelization. Compared to conventional techniques, the workload adjuster enables better performance with regard to the execution of iterations of a loop and permits more loops to be speculatively parallelized.

If the workload adjuster (which can include a compiler) decides it will parallelize the loop, it will also determine the scheduling policy by distributed loop iterations to the main and non-main threads. Since the workload adjuster knows how the work is partitioned, it is able to do some workload adjustment among the threads by migrating some startup costs incurred by the non-main threads to the main thread. Thereby reducing the total execution time.

Thus, one or more embodiments of the workload adjuster as described herein contrast with conventional systems to estimate the startup cost non-main threads and estimate the amount of workload to be migrated between different threads.

According to general embodiments of the workload adjuster, a workload adjuster estimates the startup cost of one or more non-main threads of a loop's execution and determines the amount of workload to be migrated between different threads. Specifically, upon deciding to parallelize the execution of a loop, the workload adjuster creates a scheduling policy with a workload for a main thread and workloads for respective non-main threads.

The scheduling policy distributes iterations of a parallelized loop to the workload of the main thread and iterations of the parallelized loop to the workloads of the non-main threads. The workload adjuster evaluates a start-up cost of the workload of a non-main thread and, based on the start-up cost, migrates a portion of the workload for that non-main thread to the main thread's workload.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Incorporated of Santa Clara, Calif., U.S.A., herein after referred to as "Sun." Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a workload adjuster to allow for a finer control of spin versus yield decisions, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
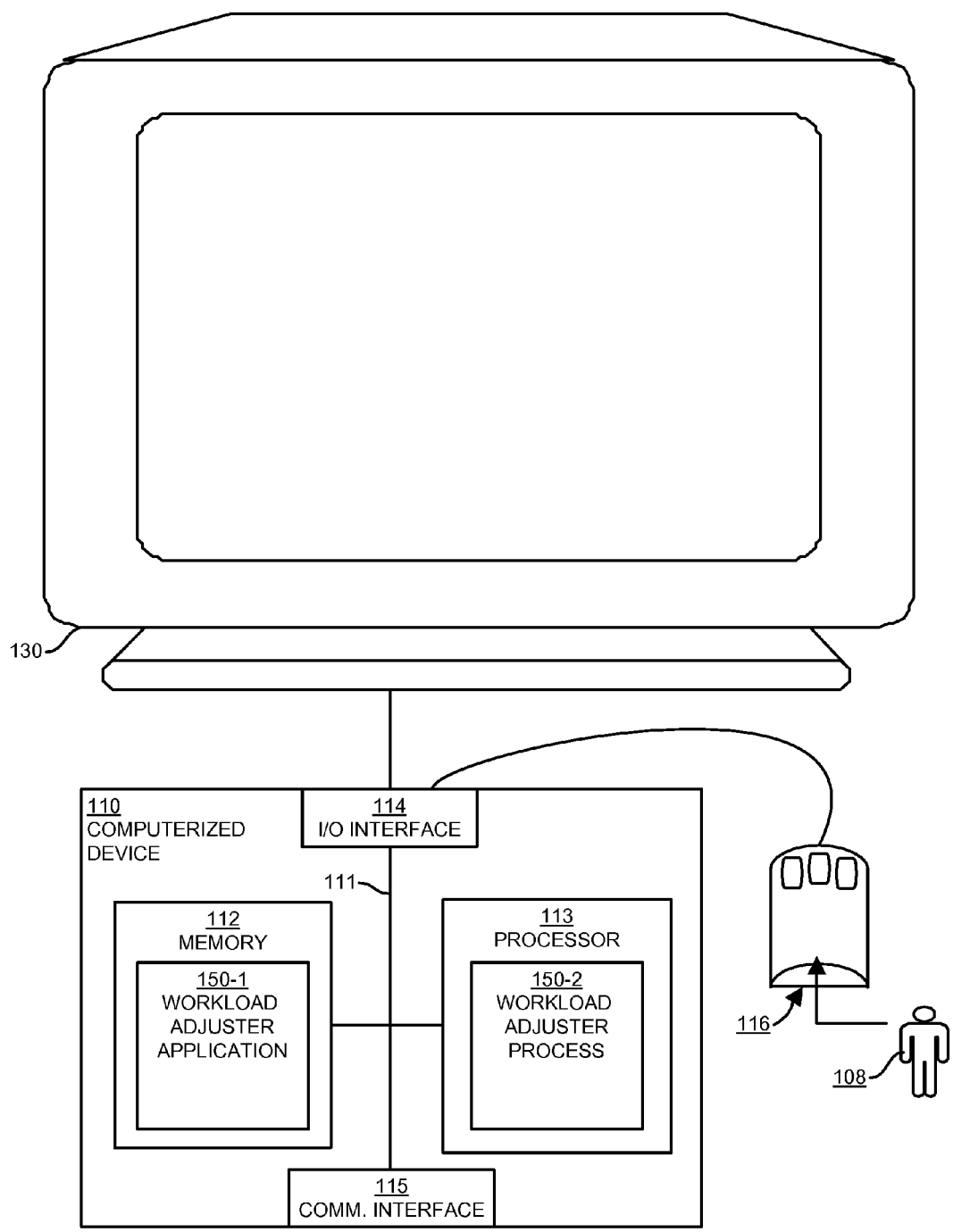
FIG. 1 is a block diagram of an example of architecture for a computer system that executes, runs, interprets, operates a workload adjuster according to embodiments herein.

Methods and apparatus provide for a workload adjuster to estimate the startup cost of one or more non-main threads of loop execution and to estimate the amount of workload to be migrated between different threads. Upon deciding to parallelize the execution of a loop, the workload adjuster creates a scheduling policy with a workload for a main thread and workloads for respective non-main threads. The scheduling policy distributes iterations of a parallelized loop to the workload of the main thread and iterations of the parallelized loop to the workloads of the non-main threads. The workload adjuster evaluates a start-up cost of the workload of a non-main thread and, based on the start-up cost, migrates a portion of the workload for that non-main thread to the main thread's workload.

In order to evaluate a start-up cost of the workload for each non-main thread, the workload adjuster calculates an updated storage metric, a storage latency metric and a cold startup overhead metric for each non-main thread. The updated storage metric measures the time cost incurred to read a global variable shared between the non-main thread and the main thread.

The storage latency metric measures the time cost for updating and storing each global variable(s) and the cold startup overhead metric measures the time cost for warming a cold resource (i.e. a private data cache, a translation lookaside buffer, a private instruction cache, a private branch predictor).

In order to calculate the cold startup overhead metric, the workload adjuster identifies each load and store operation in the non-main thread that is likely to miss in the cold resource. For each load and store operation that misses in the cold resource, a cache latency is identified and a probability of execution is computed. The cache latency represents the amount of time it takes to bring data required by the load operation from memory to the cold resource.

By multiplying the probability of execution for each load and store operation by the each operation's corresponding cache latency, a warm-up cost for each operation (i.e. load, store) is be calculated. Thus, the workload adjuster creates the cold startup overhead metric by aggregating the warm-up costs of each load and store operation.

A total overhead metric for the non-main thread can then be created by aggregating the updated storage metric by the storage latency metric and the cold startup overhead metric [e.g. (updated storage metric)+(storage latency metric)+(cold startup overhead metric)].

The workload adjuster also calculates a time estimate per iteration of the parallelized loop by aggregating the execution cost of each operation. The time estimate per iteration estimates the total execution time to execute one iteration of the original parallelized loop, assuming a warm processor environment. The execution cost of each operation is calculated by multiplying the operation's execution time cost by the operation's execution frequency.

The workload adjuster then determines the total number of threads (i.e. main threads and non-main threads) and multiplies the total number of threads by the time estimate iteration. An iteration shift metric is created by dividing the total overhead metric by the result from multiplying the time estimate per iteration [i.e. iteration shift=total overhead/(number of threads×time estimate per iteration)].

If the loop granularity is relatively large compared to the total overhead metric, then the iteration shift metric can be equal to zero which means that no portions from any non-main threads need to be shifted to the main thread's workload.

If the total overhead metric is much bigger than the time estimate per iteration, then the value of the iteration shift metric could be even greater than the number of iterations which is originally partitioned for each thread without considering startup cost. In such a case, large overhead makes parallelization a bad choice and the workload adjuster will execute the parallelized loop in the workload of the one main thread only.

However, upon determining that the iteration shift metric is: (1) greater than zero, (2) less than a number of iterations distributed to the workload of the main thread, and (3) less than a number of iterations distributed to the workload of the non-main thread, the workload adjuster calculates an execution time increase metric.

To calculate the execution time increase metric, the workload adjuster multiplies the total overhead metric by the total number of threads less one (i.e. total number of threads−1), the value accounting for the main thread and the at least one non-main thread. The result is then divided by the total number of threads [e.g. execution time increase=((total overhead)×(total number of threads−1))/(total number of threads)].

The workload adjuster then shifts a portion (i.e. one or more iterations) of the non-main thread's workload over to the workload of the main thread such that an execution time for the portion consumes an amount of time that is equal or less than the execution time increase metric.

Turning now to FIG. 1, a block diagram illustrates an example of architecture for a computer system 110 that executes, runs, interprets, operates or otherwise performs an workload adjuster application 150-1 and/or workload adjuster process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the workload adjuster 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the workload adjuster application 150-1 and/or the workload adjuster process 150-2 can be distributed over a networked environment.

The memory system 112 can be any type of computer readable medium and, in this example, is encoded with an workload adjuster application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the workload adjuster application 150-1. Execution of the workload adjuster application 150-1 in this manner produces the workload adjuster process 150-2. In other words, the workload adjuster process 150-2 represents one or more portions or runtime instances of the workload adjuster application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the workload adjuster application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the workload adjuster application 150-1. Execution of the workload adjuster application 150-1 in this manner produces processing functionality in an workload adjuster process 150-2. In other words, the workload adjuster process 150-2 represents one or more portions or runtime instances of the workload adjuster application 150-1 (or the entire targeted advertisement application 150-1) performing or executing within or upon the processor 113 in the computerized device 110 at runtime.

Figure 2:
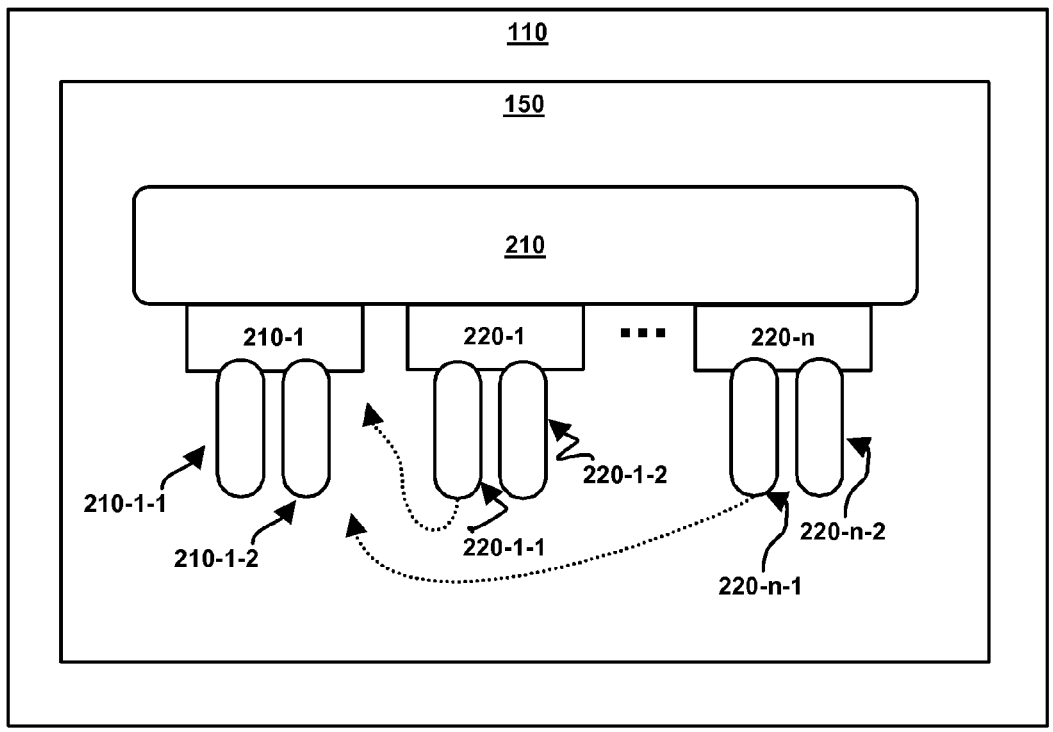
FIG. 2 is a block diagram of an example of a computer system configured with a workload adjuster according to embodiments herein.

FIG. 2 is a block diagram of an example of a computer system configured with a workload adjuster according to embodiments herein. A loop 210 can have a main thread 210-1 and multiple non-main threads 220-1 . . . 220-n. The workload adjuster 150 can create a scheduling policy that assigns iterations 210-1-1, 210-1-2 to the main thread 210-1. Iterations 220-1-1, 220-1-2 can also be assigned to the non-main thread 220-1. Other iterations 220-n-1, 220-n-2 can be further assigned to other non-main threads 220-n.

Based on the start-up costs for performing the first iteration 220-1-1, 220-n-1 of each non-main thread 220-1, 220-n, the workload adjuster 150 can migrate the first iterations (i.e. portions) 220-1-1, 220-n-1 from the non-main threads 220-1, 220-n to the main thread 210-1. By shifting some workload from each of the non-main threads 220-1, 220-n, the non-main threads 220-1, 220-n are compensated for start-up costs and the overall execution time of loop 210 is reduced.

With regard to the flowcharts 300, 400, 500, 600, 700 illustrating embodiments of the workload adjuster 150, the rectangular elements of FIGS. 3-7 are herein denoted "processing blocks" and represent computer software instructions or groups of instructions upon a computer readable medium. Alternatively, the processing blocks represent steps performed by functionally equivalent circuits such as a digital signal processor circuit or an application specific integrated circuit (ASIC). The flowcharts do not depict the syntax of any particular programming language.

Rather, the flowcharts 300, 400, 500, 600, 700 illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
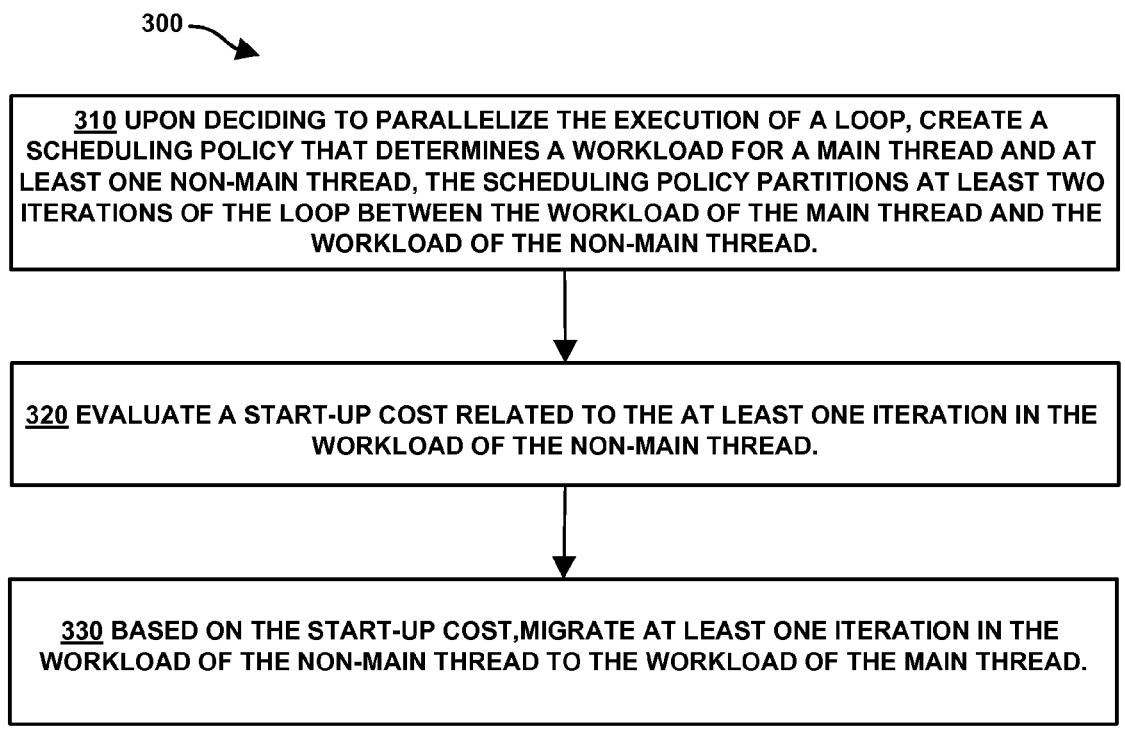
FIG. 3 is a flowchart of an example of processing steps performed by a workload adjuster to migrate workload of a non-main thread to the workload of a main thread according to embodiments herein.

FIG. 3 is a flowchart 300 of an example of processing steps performed by a workload adjuster to migrate workload of a non-main thread to the workload of a main thread according to embodiments herein. At step 310, upon deciding to parallelize the execution of a loop 210, the workload adjuster 150 creates a scheduling policy that determines a workload for a main thread 210-1 and at least one non-main thread 220-1 . . . 220-n. The scheduling policy partitions (i.e. distributes) iterations of the loop 210 between the workload of the main thread 210-1 and the workload for each non-main thread 220-1 . . . 220-n.

At step 320, the workload adjuster 150 evaluates a start-up cost related to the at least one iteration 220-1-1, 220-n-1 in the workload of each non-main thread 220-1 . . . 220-n. Based on the start-up costs, at step 330, the workload adjuster 150 migrates iterations 220-1-1, 220-n-1 in to the workload of the main thread 210-1.

As an example, for the workflow of the loop's main thread 210-1 executed by the workload adjuster 150, the main thread can include any number of sub-tasks from a starting time of "T1" to "T5". Examples of a variety of sub-tasks for the main thread 210-1 are provided below in high level pseudocode.

```
T1:    <prepare some global variables>
T2:    start = 1; /* signal the non-main thread to
start */
T3:    <prepare and do its own work>
T4:    while (!non_main_done) ;   /* spin waiting for
the non-main thread */
T5:    non_main_done = 0;   /* reset "non_main_done" */
T6:    <continue and return to the caller>
```

For example, "T2" means that at time "T2", the main thread 210-1 starts to execute "start=1". "T5" means that at time "T5", the main thread 210-1 gets out of the spin waiting loop and resets the variable "non_main_done". To minimize the total execution time, the workload adjuster 150 will minimize T5 to T3.

For a non-main thread 220-1, similarly, each sub-task for the non-main thread 220-1 can have a starting time of "T10" to "T14". Examples of a variety of sub-tasks for the non-main thread 220-1 are provided below in high level pseudocode.

```
T10:    while (!start) ; /* spin waiting for the
signal from the main thread */
T11:    start = 0;    /* reset "start" */
T12:    <prepare and do its own work>
T13:    non_main_done = 1; /* signal I am done */
T14:    go to non_main_begin; /* continue and spin-waiting for
the next parallel region */
```

To minimize "T5-T3", the workload adjuster 150 will migrate workloads (e.g. iteration 220-1-1) so that "T14" is equal to "T4" at runtime.

Where the scheduling policy evenly partitions loop iterations 210-1-1, 210-1-2, 220-1-1, 220-1-2, 220-n-1, 220-n-2 among all threads 210-1, 220-1 . . . 220-n, which is a common scheduling policy, then both the main 210-1 and non-main thread(s) 220-1 . . . 220-n will spend equal time to prepare and do their own work, for example, "T13-T12" will be equal to "T4-T3". However, compared to the main thread 210-1, the non-main thread 220-1 executes more work by getting the updated store value (variable "start") in order to get out of its spinning loop, storing the global variable "start" and experiencing other costs due to warming cold resources (private cache, private TLB, etc.).

As the non-main thread(s) 220-1 . . . 220-n experience the extra work, the main thread 210-1 will have to spend extra time in its spin waiting loop ("T5-T4"). To counteract the effect from having the non-main thread 220-1 . . . 220-n run longer than the main thread 210-1, the workload adjuster 150 will shift some workload from the non-main thread(s) 220-1 . . . 220-n to the main thread 210-1 such that the main thread 210-1 gets more work to do and the non-main thread(s) 220-1 . . . 220-n gets less work to do. Hence, overall execution time for the loop 210 is reduced.

Figure 4:
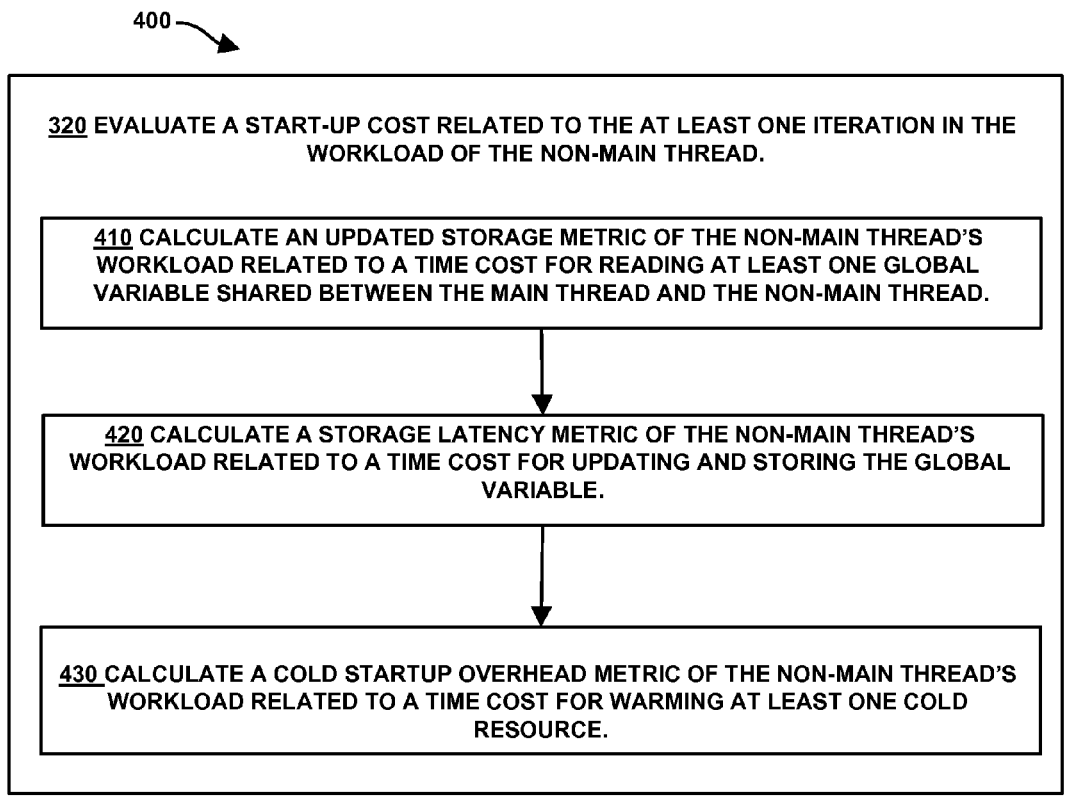
FIG. 4 is a flowchart of an example of processing steps performed by a workload adjuster to evaluate a start-up cost for a non-main thread according to embodiments herein.

FIG. 4 is a flowchart 400 of an example of processing steps performed by a workload adjuster 150 to evaluate a start-up cost for a non-main thread 220-1 . . . 220-n according to embodiments herein. At step 410, the workload adjuster 150 calculates an updated storage metric of the non-main thread's 220-1 workload related to a time cost for reading global variables shared between the main thread 210-1 and the non-main thread 220-1. For example, with regard to the discussion of FIG. 3, the updated storage metric can be the communication time incurred for the non-main thread 220-1 to retrieve an updated variable value (e.g. variable "start") that the non-main thread 220-1 uses to get out of its spinning loop.

At step 420, the workload adjuster 150 calculates a storage latency metric of the non-main thread's 220-1 workload related to a time cost for updating and storing a global variable. At step 430, the workload adjuster 150 calculates a cold startup overhead metric of the non-main thread's 220-1 workload related to a time cost for warming a cold resource.

Figure 5:
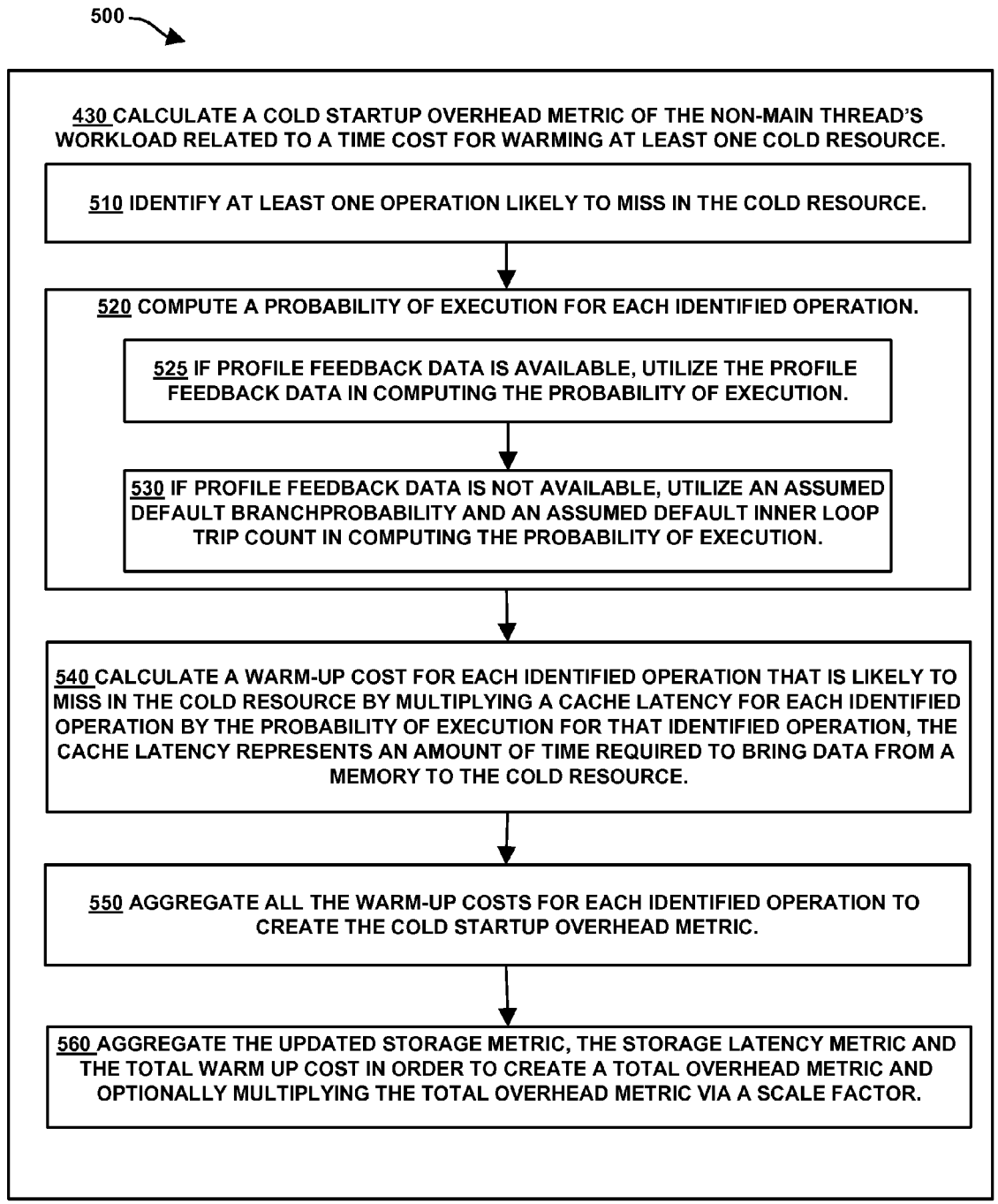
FIG. 5 is a flowchart of an example of processing steps performed by a workload adjuster to calculate a cold startup overhead metric of the non-main thread according to embodiments herein.

FIG. 5 is a flowchart 500 of an example of processing steps performed by a workload adjuster 150 to calculate a cold startup overhead metric of the non-main thread according to embodiments herein. At step 510, the workload adjuster 150 identifies operations (e.g. load, store) likely to miss in the cold resource. For example, when data requested by the operation is not present in the cold resource (i.e. private cache) then the data has to come from memory. Since it will take more time to place data from memory into the cold resource, the operation will have a longer execution time than when the data is present in the cold resource. There may be more than one level of private cache, with small, fast private caches very close to the execution units, and larger, slower caches being farther away. It is understood that the memory can be beyond the last level of the private cache. Missing the private cache (i.e. cold resource) thereby means that the operation is going to take the necessary time to get the data from memory.

At step 520, the workload adjuster 150 computes a probabilistic execution frequency for each identified operation (i.e. operation likely to miss the cold resource). At step 525, if profile feedback data is available, the workload adjuster 150 utilizes the profile feedback data in computing the probabilistic execution frequency.

At step 530, if profile feedback data is not available, the workload adjuster 150 utilizes an assumed default branch probability and an assumed default inner loop trip count in computing the probabilistic execution frequency (referred to as "probability of execution" in the Figures).

The probabilistic execution frequency of an instruction is related to the probability of executing the basic block that contains the instruction. For example, a simple loop body can provide instruction execution counts in profile feedback as follows:

```
s1       // 100
s2
if (c1) {
    s3       // 80
    s4
} else {
    s5       // 20
    s6
}
s7
s8
```

According to the psuedocode above, it can be inferred that the probability of executing s1, s2, s7, and s8 is 1, the probability of executing s3 and s4 is 0.8, and the probability of executing s5 and s6 is 0.2.

At step 540, the workload adjuster 150 calculates a warm-up cost for each identified operation that is likely to miss in the cold resource by multiplying a cache latency for each identified operation by the probabilistic execution frequency for that identified operation. The cache latency represents an amount of time required to bring the data from a memory into the cold resource.

At step 550, the workload adjuster 150 aggregates all the warm-up costs for each identified operation to create the cold startup overhead metric. At step 560, the workload adjuster 150 aggregates the updated storage metric, the storage latency metric and the total warm up cost in order to create a total overhead metric and optionally multiplying the total overhead metric via a scale factor.

Figure 6:
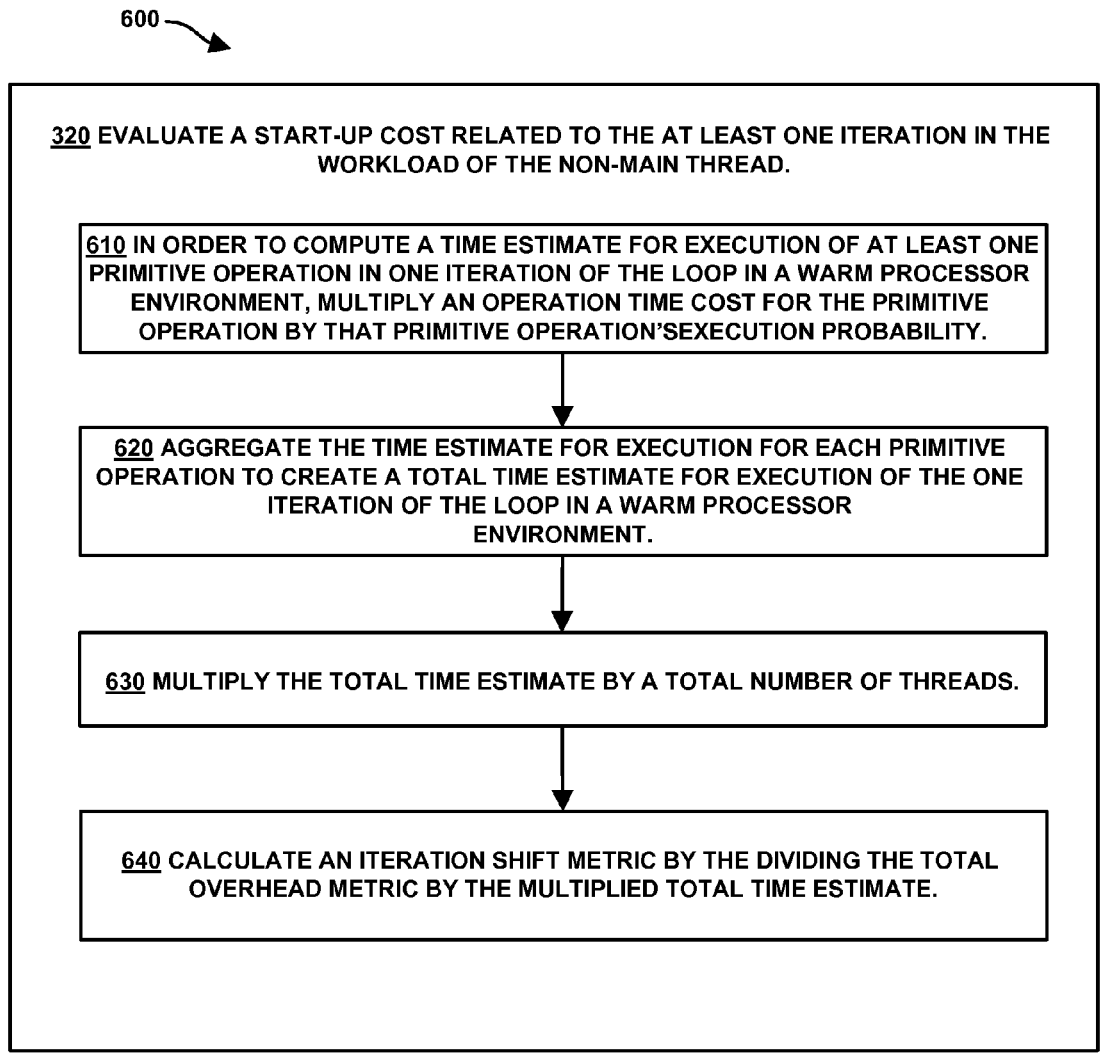
FIG. 6 is a flowchart of an example of processing steps performed by a workload adjuster to evaluate the start-up cost related to the iteration in the workload of a non-main thread according to embodiments herein.

FIG. 6 is a flowchart 600 of an example of processing steps performed by a workload adjuster 150 to evaluate the start-up cost related to the iteration in the workload of the non-main thread according to embodiments herein.

At step 610, in order to compute a time estimate for execution of at least one primitive operation in one iteration 220-1-1 of the loop 210 in a warm processor environment, the workload adjuster 150 multiplies an operation time cost for the primitive operation by that primitive operation's execution probability.

At step 620, the workload adjuster 150 aggregates the time estimate for execution for each primitive operation to create a total time estimate for execution of the one iteration 220-1-1 of the loop 210 in a warm processor environment.

At step 630, the workload adjuster 150 multiplies the total time estimate by a total number of threads.

At step 640, the workload adjuster 150 calculates an iteration shift metric by dividing the total overhead metric by the multiplied total time estimate of step 630.

Figure 7:
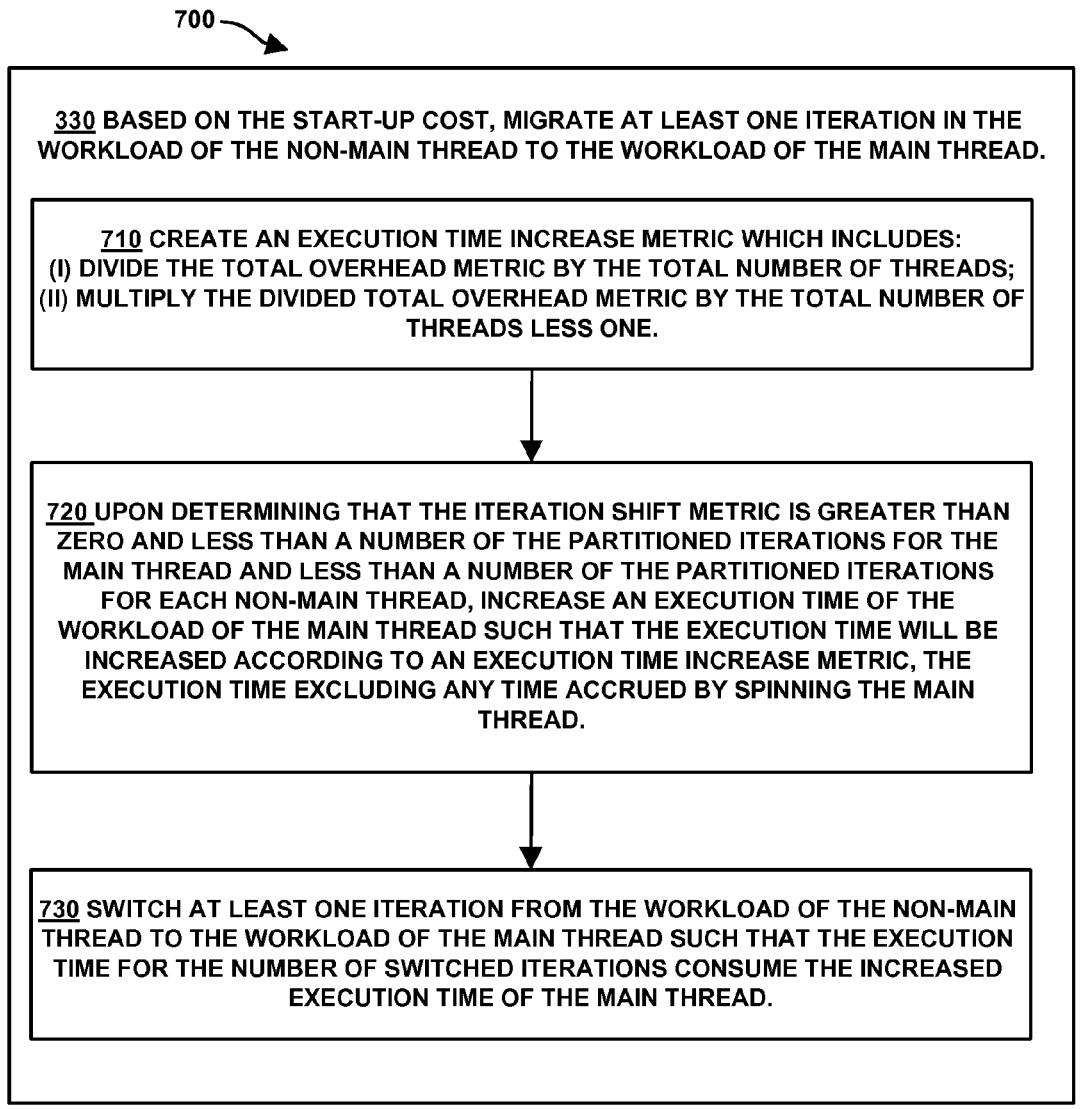
FIG. 7 is a flowchart of an example of processing steps performed by a workload adjuster to migrate at least one iteration in the workload of the non-main thread to the workload of the main thread based on the start-up cost according to embodiments herein.

FIG. 7 is a flowchart 700 of an example of processing steps performed by a workload adjuster 150 to migrate at least one iteration in the workload of the non-main thread to the workload of the main thread based on the start-up cost according to embodiments herein.

At step 710, the workload adjuster 150 creates an execution time increase metric which includes dividing the total overhead metric by the total number of threads, and multiplying the divided total overhead metric by the total number of threads less one (i.e. total number of threads−1).

At step 720, upon determining that the iteration shift metric is (i) greater than zero, (ii) less than a number of the partitioned iterations for the main thread 210-1 and (iii) less than a number of the partitioned iterations for each non-main thread 220-1, 220-n. The workload adjuster 150 increases an execution time of the workload of the main thread 210-1 such that the execution time will be increased according to an execution time increase metric. The execution time is derived to exclude any time accrued by spinning the main thread 210-1.

At step 730, the workload adjuster 150 switches an iteration 220-1-1 from the workload of the non-main thread 220-1 to the workload of the main thread 210-1 such that the execution time for the number of switched iterations consume the increased execution time of the main thread 210-1.

Where the iteration shift metric could be 0, which means that no iteration shift from non-main threads 220-1 . . . 220-n to the main thread 210-1 is needed, then the loop granularity is relatively large compared to the total overhead metric. If the total overhead metric is much bigger than the estimated time per iteration, the value of the iteration shift metric could be even greater than the number of iterations which is originally partitioned for each thread 210-1, 220-1 . . . 220-n without considering startup cost. In such a case, large overhead makes parallelization a bad choice and the parallelization library will execute the workload with one main thread 210-1 only.

Where the iteration shift metric is greater than 0, but less than the number of iterations originally partitioned for each thread 210-1, 220-1 . . . 220-n without considering startup cost, then shifting workload from non-main threads 220-1 . . . 220-n to the main thread 210-1 will be able to result in some total execution time savings.

Suppose the original work is partitioned evenly across all threads 210-1, 220-1 . . . 220-n, then the main thread's 210-1 execution time, excluding any spin-waiting time, can be increased by (total number of threads−1)*total overhead metric/total number of threads.

In addition, the spin waiting time will be decreased to 0. Further, the execution time for each non-main thread 220-1 . . . 220-n will be decreased by total overhead metric/total number of threads. The total execution time for the loop is also reduced by overhead metric/total number of threads.

Note again that techniques herein are well suited for a workload adjuster 150 that allows for estimating the startup cost non-main threads and estimating the amount of workload to be migrated between different threads. The workload adjuster application 150-1 may be stored on a computer readable medium (such as a floppy disk), hard disk, electronic, magnetic, optical, or other computer readable medium. It is understood that embodiments and techniques discussed herein are well suited for other applications as well.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   creating a scheduling policy that creates a first workload for a main thread and at least one second workload for at least one non-main thread, the scheduling policy distributing at least one first iteration of a parallelized loop to the workload of the main thread and at least one second iteration of the parallelized loop to the workload of the non-main thread;
   evaluating a start-up cost of the workload of the non-main thread, wherein evaluating comprises
      calculating an updated storage metric, the updated storage metric measuring a first time cost incurred by the non-main thread to read at least one global variable that is shared between the non-main thread and the main thread,
      calculating a storage latency metric, the storage latency metric measuring a second time cost for updating and storing the global variable, and
      calculating a cold startup overhead metric, the cold startup overhead metric measuring a third time cost for warming at least one cold resource, wherein calculating a cold startup overhead metric comprises
         identifying at least one load operation likely to miss in the cold resource, and
         for each at least one load operation
            computing a first probability of execution for the at least one load operation, and
            calculating a load warm-up cost for the at least one load operation by multiplying the first probability of execution by a first cache latency, the first cache latency representing a first amount of time to bring data required by the at least one load operation from a memory to the cold resource; and
   based on the start-up cost, migrating at least a portion of the workload of the non-main thread to the workload of the main thread.

2. The method as in claim 1, wherein calculating a cold startup overhead metric includes:
   measuring a fourth time cost for warming at least one of a private data cache, a translation lookaside buffer, a private instruction cache, a private branch predictor.

3. The method as in claim 1, further comprising:
   identifying at least one store operation likely to miss in the cold resource;
   for each at least one store operation:
      computing a second probability of execution for the at least one store operation; and
   calculating a store warm-up cost for the at least one store operation by multiplying the second probability of execution by a second cache latency, the second cache latency representing a second amount of time to bring data required by the at least one store operation from the memory to the cord resource.

4. The method as in claim 3, further comprising:
   creating the cold startup overhead metric by aggregating the load warm-up cost of each at least one load operation and the store warm-up cost of each at least one store operation; and
   calculating a total overhead metric for the non-main thread by aggregating the updated storage metric by the storage latency metric and the cold startup overhead metric.

5. The method as in claim 1, wherein evaluating a start-up cost of the workload of the non-main thread includes:
calculating a time estimate per iteration of the parallelized loop comprising:
for each operation in the parallelized loop:
calculating an execution cost of the at least one operation in the parallelized loop by multiplying a time cost for executing the at least one operation by an execution frequency of the at least one operation;
aggregating the execution cost of each operation in the parallelized loop to create the time estimate per iteration;
multiplying the time estimate per iteration by a value representing a total number of threads sharing the execution of the parallelized loop, the value representing the total number of threads accounting for the main thread and the at least one non-main thread;
calculating an iteration shift metric by dividing a total overhead metric by a result from the step of multiplying the time estimate per iteration.

6. The method as in claim 1, further comprising:
upon determining that an iteration shift metric is equal to zero:
maintaining the workload of the non-main thread.

7. The method as in claim 1, wherein migrating at least a portion of the workload of the non-main thread to the workload of the main thread includes:
calculating an execution time increase metric upon determining that an iteration shift metric is: (1) greater than zero, (2) less than a number of iterations distributed to the workload of the main thread, and (3) less than a number of iterations distributed to the workload of the non-main thread, which includes:
(i) multiplying a total overhead metric by a value representing a total number of threads less one, the value accounting for the main thread and the at least one non-main thread;
(ii) dividing a result from the step of multiplying the total overhead metric by the value representing a total number of threads; and
shifting the portion from the workload of the non-main thread to the workload of the main thread such that an execution time for the portion consumes an amount of time that is equal or less than the execution time increase metric.

8. A non-transitory computer readable medium comprising executable instructions encoded thereon operable on a computerized device to perform processing comprising:
instructions for creating a scheduling policy that creates a first workload for a main thread and at least one second workload for at least one non-main thread, the scheduling policy distributing at least one first iteration of a parallelized loop to the workload of the main thread and at least one second iteration of the parallelized loop to the workload of the non-main thread;
instructions for evaluating a start-up cost of the workload of the non-main thread, wherein the instructions for evaluating a start-up cost of the workload of the non-main thread include
instructions for calculating an updated storage metric, the updated storage metric measuring a first time cost incurred by the non-main thread to read at least one global variable that is shared between the non-main thread and the main thread,
instructions for calculating a storage latency metric, the storage latency metric measuring a second time cost for updating and storing the global variable, and
instructions for calculating a cold startup overhead metric, the cold startup overhead metric measuring a third time cost for warming at least one cold resource, wherein the instructions for calculating a cold startup overhead metric include
instructions for identifying at least one load operation likely to miss in the cold resource,
for each at least one load operation
instructions for computing a first probability of execution for the at least one load operation, and
instructions for calculating a load warm-up cost for the at least one load operation by multiplying the first probability of execution by a first cache latency, the first cache latency representing a first amount of time to bring data required by the at least one load operation from a memory to the cold resource; and
instructions for migrating at least a portion of the workload of the non-main thread to the workload of the main thread based on the start-up cost.

9. The computer readable medium as in claim 8, wherein the instructions for calculating a cold startup overhead metric include:
instructions for measuring a fourth time cost for warming at least one of a private data cache, a translation lookaside buffer, a private instruction cache, a private branch predictor.

10. The computer readable medium as in claim 8, further comprising:
instructions for identifying at least one store operation likely to miss in the cold resource;
for each at least one store operation:
instructions for computing a second probability of execution for the at least one store operation; and
instructions for calculating a store warm-up cost for the at least one store operation by multiplying the second probability of execution by a second cache latency, the second cache latency representing a second amount of time to bring data required by the at least one store operation from the memory to the cold resource.

11. The computer readable medium as in claim 10, further comprising:
instructions for creating the cold startup overhead metric by aggregating the load warm-up cost of each at least one load operation and the store warm-up cost of each at least one store operation; and
instructions for calculating a total overhead metric for the non-main thread by aggregating the updated storage metric by the storage latency metric and the cold startup overhead metric.

12. The computer readable medium as in claim 8, wherein the instructions for evaluating a start-up cost of the workload of the non-main thread include:
instructions for calculating a time estimate per iteration of the parallelized loop comprising:
for each operation in the parallelized loop:
instructions for calculating an execution cost of the at least one operation in the parallelized loop by multiplying a time cost for executing the at least one operation by an execution frequency of the at least one operation;
instructions for aggregating the execution cost of each operation in the parallelized loop to create the time estimate per iteration;
instructions for multiplying the time estimate per iteration by a value representing a total number of threads sharing the execution of the parallelized loop, the value representing the total number of threads accounting for the main thread and the at least one non-main thread;

instructions for calculating an iteration shift metric by dividing a total overhead metric by a result from the step of multiplying the time estimate per iteration.

13. The computer readable medium as in claim 8, further comprising:

instructions to maintain the workload of the non-main thread upon determining that an iteration shift metric is equal to zero.

14. The computer readable medium as in claim 8, wherein the instructions for migrating at least a portion of the workload of the non-main thread to the workload of the main thread include:

instructions for calculating an execution time increase metric upon determining that an iteration shift metric is: (1) greater than zero, (2) less than a number of iterations distributed to the workload of the main thread, and (3) less than a number of iterations distributed to the workload of the non-main thread, which includes:

(i) instructions for multiplying a total overhead metric by a value representing a total number of threads less one, the value accounting for the main thread and the at least one non-main thread;

(ii) instructions for dividing a result from the step of multiplying the total overhead metric by the value representing the total number of threads; and instructions for shifting the portion from the workload of the non-main thread to the workload of the main thread such that an execution time for the portion consumes an amount of time that is equal or less than the execution time increase metric.

15. A computer system comprising:

a processor;

a memory unit that stores instructions associated with an application executed by the processor; and an interconnect coupling the processor and the memory unit, enabling the computer system to execute the application and perform operations of:

creating a scheduling policy that creates a first workload for a main thread and at least one second workload for at least one non-main thread, the scheduling policy distributing at least one first iteration of a parallelized loop to the workload of the main thread and at least one second iteration of the parallelized loop to the workload of the non-main thread;

evaluating a start-up cost of the workload of the non-main thread; and based on the start-up cost, migrating at least a portion of the workload of the non-main thread to the workload of the main thread, wherein migrating at least a portion of the workload of the non-main thread to the workload of the main thread includes calculating an execution time increase metric upon determining that an iteration shift metric is: (1) greater than zero, (2) less than a number of iterations distributed to the workload of the main thread, and (3) less than a number of iterations distributed to the workload of the non-main thread, which includes (i) multiplying a total overhead metric by a value representing a total number of threads less one, the value accounting for the main thread and the at least one non-main thread, (ii) dividing a result from the step of multiplying the total overhead metric by the value representing the total number of threads, and shifting the portion from the workload of the non-main thread to the workload of the main thread such that an execution time for the portion consumes an amount of time that is equal or less than the execution time increase metric.

16. A method comprising:

creating a scheduling policy that creates a first workload for a main thread and at least one second workload for at least one non-main thread, the scheduling policy distributing at least one first iteration of a parallelized loop to the workload of the main thread and at least one second iteration of the parallelized loop to the workload of the non-main thread;

evaluating a start-up cost of the workload of the non-main thread; and based on the start-up cost, migrating at least a portion of the workload of the non-main thread to the workload of the main thread, wherein migrating at least a portion of the workload of the non-main thread to the workload of the main thread includes calculating an execution time increase metric upon determining that an iteration shift metric is: (1) greater than zero, (2) less than a number of iterations distributed to the workload of the main thread, and (3) less than a number of iterations distributed to the workload of the non-main thread, which includes (i) multiplying a total overhead metric by a value representing a total number of threads less one, the value accounting for the main thread and the at least one non-main thread, (ii) dividing a result from the step of multiplying the total overhead metric by the value representing the total number of threads, and shifting the portion from the workload of the non-main thread to the workload of the main thread such that an execution time for the portion consumes an amount of time that is equal or less than the execution time increase metric.

17. A non-transitory computer readable medium comprising executable instructions encoded thereon operable on a computerized device to perform processing comprising:

instructions for creating a scheduling policy that creates a first workload for a main thread and at least one second workload for at least one non-main thread, the scheduling policy distributing at least one first iteration of a parallelized loop to the workload of the main thread and at least one second iteration of the parallelized loop to the workload of the non-main thread;

instructions for evaluating a start-up cost of the workload of the non-main thread; and instructions for migrating at least a portion of the workload of the non-main thread to the workload of the main thread based on the start-up cost, wherein the instructions for migrating at least a portion of the workload of the non-main thread to the workload of the main thread include instructions for calculating an execution time increase metric upon determining that an iteration shift metric is: (1) greater than zero, (2) less than a number of iterations distributed to the workload of the main thread, and (3) less than a number of iterations distributed to the workload of the non-main thread, which includes (i) instructions for multiplying a total overhead metric by a value representing a total number of threads less one, the value accounting for the main thread and the at least one non-main thread, and
(ii) instructions for dividing a result from the step of multiplying the total overhead metric by the value representing the total number of threads, and instructions for shifting the portion from the workload of the non-main thread to the workload of the main thread such that an execution time for the portion consumes an amount of time that is equal or less than the execution time increase metric.

* * * * *